UNITED STATES PATENT OFFICE 2,474,589

SUBSTITUTED 3 - CARBAMYL-2-PIPERI-DONES AND METHOD FOR PREPARING THEM

Glen H. Morey, Terre Haute, Ind., assignor to Commercial Solvents Corporation, county of Vigo, Ind., a corporation of Maryland No Drawing. Application March 5, 1945, Serial No. 581,183

4 Claims. (Cl. 260—294)

This invention relates to new substituted 3-carbamyl-2-piperidones and to a method for preparing them. More particularly it relates to compounds having the following general formula:

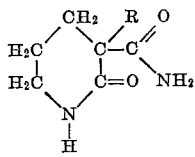

wherein R may be alkyl or aralkyl.

In my copending application Serial No. 581,181, filed March 5, 1945, I have described a method for preparing 3-carbamyl-2-piperidone which involves catalytically hydrogenating a mixture of a dialkyl α-(2-cyanoethyl)malonate and ammonia in the liquid phase at elevated temperatures.

When attempts were made to prepare α-substituted 3-carbamyl-2-piperidones by a similar process, i. e. by catalytically hydrogenating a dialkyl α- substituted α-(2-cyanoethyl) malonate as there described, the carbamyl product was not obtained but instead the corresponding substituted 3-carbalkoxy-2-piperidone was obtained as described in my copending application Serial No. 581,182, filed March 5, 1945.

I have now found that the substituted 3-carbamyl-2-piperidones may be prepared by treating the substituted 3-carbalkoxy-2-piperidones in the liquid phase with ammonia and an ammonium halide as described hereinafter.

In carrying out my invention, I mix the substituted 3-carbalkoxy-2-piperidone with an inert liquid, ammonia and an ammonium halide. The mixture is then heated for a number of hours in a closed vessel, usually a period of about five to twelve hours being sufficient. After the heating period the vessel is opened, the inert liquid and ammonia are removed, as by evaporation, the ammonium halide is removed as by washing with water and the residue, which is the crude substituted 3-carbamyl-2-piperidone, is recovered as by crystallization from a solvent.

The inert liquid is one which is at least to some extent a mutual solvent for the reacting components, and preferably one which may be readily removed after the reaction is complete, for example, the lower alcohols such as methanol, ethanol, etc., 1,4-dioxane and the like.

The following specific examples will further illustrate my invention.

Example I

A mixture of 47 parts of 3-carbethoxy-3-benzyl-2-piperidone, 200 parts of methanol, 100 parts of liquid ammonia and 10 parts of ammonium chloride was prepared and placed in a bomb. The bomb was closed, and heated at 125° C. for eight hours. After this period, the bomb was opened, the methanol and ammonia were removed from the charge by evaporation, and the remaining material was washed with water to remove ammonium chloride. The remaining solid 3-benzyl-3-carbamyl-2-piperidone was recrystallized from methanol and dried in vacuo. Ten parts of product were obtained corresponding to a yield of 26%. The nitrogen analysis of this compound was 11.94% as compared to a theoretical value of 12.06%.

Example II

A reaction bomb was charged with a mixture of 73 parts of 3-carbethoxy-3-ethyl-2-piperidone, 200 parts of methanol, 200 parts of liquid ammonia and 10 parts of ammonium chloride. The vessel was closed, and the charge heated at about 125° C. for eight hours. After the heating period the charge was removed from the bomb, the methanol and ammonia were removed by evaporation, the residue was washed with water to remove the ammonium chloride, and the solid residue was recrystallized from benzene, resulting in a yield of 10 parts of 3-carbamyl-3-ethyl-2-piperidone corresponding to a yield of 16.2%. The nitrogen value found for this compound was 15.79% as compared to a theoretical value of 16.46%.

My new compounds are useful in carrying out further organic syntheses and are of value in the preparation of useful compounds in the pharmaceutical field.

While the above describes the preferred embodiments of my invention, it will be understood that departures may be made therefrom within the scope of the specification and claims.

What is claimed is:

1. As new compositions of matter 3-carbamyl-2-piperidones having the following general formula:

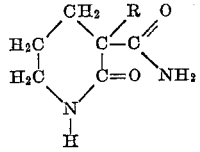

wherein R is a member selected from the group consisting of alkyl and aralkyl.

2. In a process for preparing 3-carbamyl-2-piperidones having the following general formula:

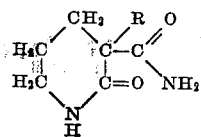

wherein R is a member selected from the group consisting of alkyl and aralkyl, the step which comprises heating, in the liquid phase and in a closed vessel, a 3-substituted-3-carbalkoxy-2-piperidone having the formula:

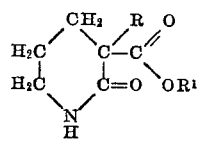

wherein R is a member selected from the group consisting of alkyl and aralkyl and $R^1$ is an alkyl radical with an ammonium halide and ammonia.

3. 3-carbamyl-3-benzyl-2-piperidone.
4. 3-carbamyl-3-ethyl-2-piperidone.

GLEN H. MOREY.

REFERENCES CITED

The following references are of record in the file of this patent:

Koelsch:—J. Am. Chem. Soc., vol. 65; pp. 2458–2459.

Fieser et al.:—Organic Chemistry (D. C. Heath & Co., Boston 1944), pages 183 and 242.